June 2, 1936.  C. W. HOPES  2,042,993
CULINARY UTENSIL
Filed July 11, 1935
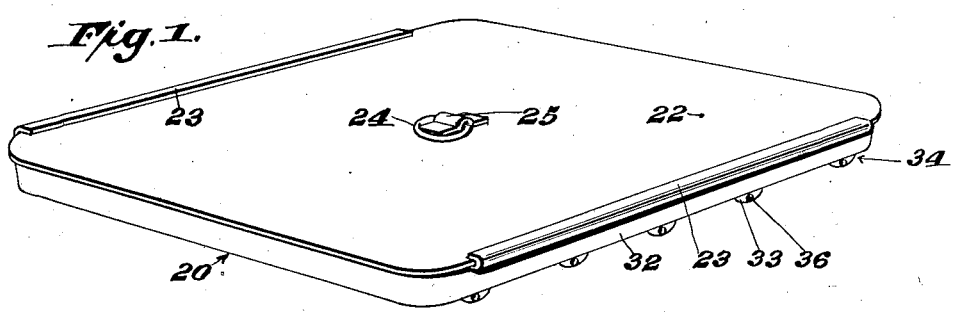
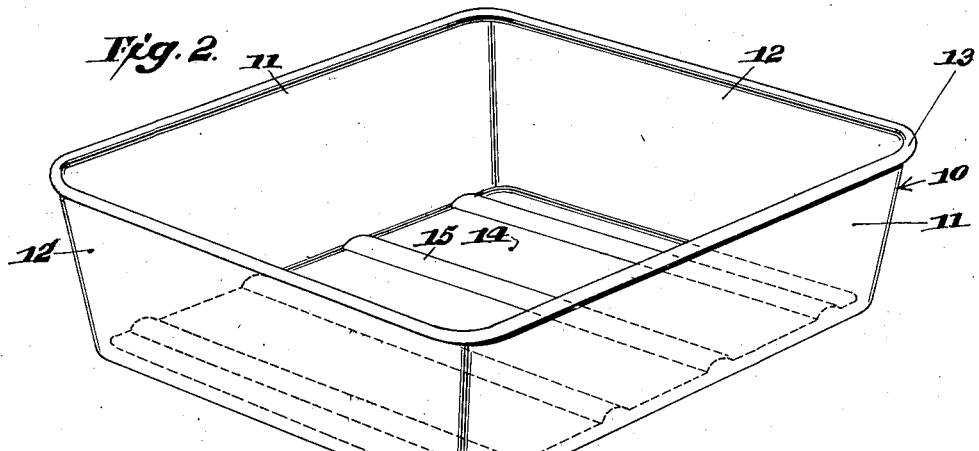
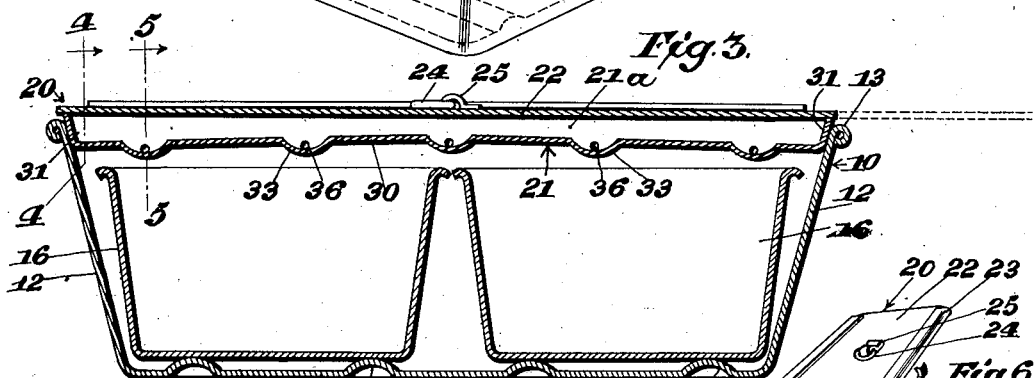
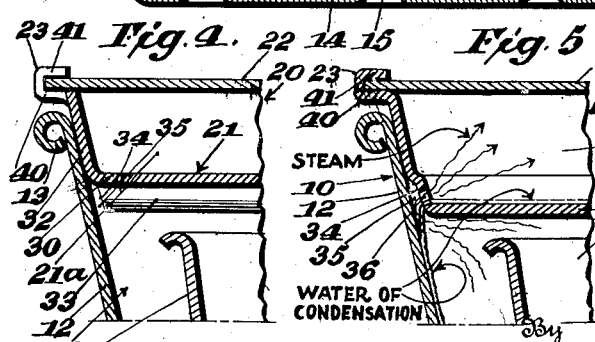
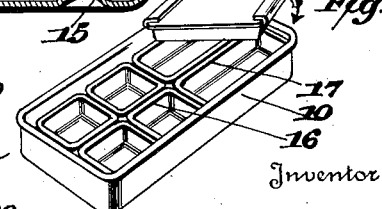
Inventor
Charles W. Hopes,
Munn, Anderson & Liddy
Attorney Patented June 2, 1936

2,042,993

UNITED STATES PATENT OFFICE 2,042,993

CULINARY UTENSIL

Charles W. Hopes, Miami, Fla.

Application July 11, 1935, Serial No. 30,904

5 Claims. (Cl. 53—6)

This invention relates to a combined steam cooker and refrigerator tray.

An object of the invention is the provision of a tray adapted to house a plurality of containers for food with a cover having a chamber therein adapted to seal the tray from the atmosphere, the tray being of such a construction that it may be used for cooking foods by means of steam or for placing the foods in a refrigerator where they are kept at a predetermined temperature or the tray may be removed bodily from the refrigerator and placed in an oven or over a flame so that the food may be heated before serving.

Another object of the invention is the provision of a tray adapted to house a plurality of containers for food, the cover being applied to the open portion of the tray for sealing the same against the atmosphere whereby foods located in the containers in the tray may be cooked directly with steam which is permitted to circulate around containers, the cover having a chamber which is also sealed from the atmosphere and provided with a bottom portion containing grooves which will direct the moisture to a pair of walls of the tray so that such moisture will be conducted by said walls to the bottom of the tray where it is again converted into steam.

A further object of the invention is the provision of a tray for housing a plurality of containers for food and for either cooking the food by means of steam or for housing the food in a refrigerator, said tray having a cover including a bottom portion, side and end walls and a slidable closure to provide a chamber in the cover, said bottom being inclined from a medial line in an opposite direction to a pair of the oppositely disposed walls of the tray, said bottom being provided with grooves for conducting moisture towards openings in the pair of the walls of the cover whereby said moisture will be conducted by the adjacently disposed walls of the tray to the bottom thereof, the last-mentioned walls of the tray having inwardly offset portions whereby said portions of the walls are spaced from the adjacent walls of the tray to provide a space for the escape of moisture from the grooves onto the adjacently disposed walls of the tray.

This invention will be best understood from a consideration of the following detailed description, in view of the accompanying drawing forming a part of the specification; nevertheless, it is to be understood that the invention is not confined to the disclosure, being susceptible of such changes and modifications as define no material departure from the salient features of the invention as expressed in the appended claims.

In the drawing:

Figure 1 is a view in perspective of a cover constructed in accordance with the principles of my invention, Figure 2 is a view in perspective of a tray to which the cover is adapted to be applied, Figure 3 is a longitudinal section of the tray and cover, Figure 4 is a fragmentary vertical section taken along the line 4—4 of Figure 3, Figure 5 is a fragmentary vertical section taken along the line 5—5 of Figure 3, and Figure 6 is a view in perspective of the tray showing the food containers applied thereto with the cover in removed position.

Referring more particularly to the drawing, 10 designates a tray which may be formed of metal of any suitable type or of a refractory glass which will stand high temperatures during the steaming operation. This tray is provided with inclined side walls 11 and inclined end walls 12. A bead 13 is provided at the periphery of the open end of the tray.

The bottom 14 of the tray is provided with ribs 15 which may extend longitudinally or transversely of said bottom in order to support a plurality of food containers 16 and 17 which are so constructed that they will neatly fit within the tray 10. The ribs 15 elevate the containers 16 and 17 above the bottom 14 of the tray to permit steam to completely surround the containers whereby the food in said containers will be thoroughly and uniformly cooked throughout.

A cover, generally designated by the numeral 20, consists of a shallow pan-like member generally designated by the numeral 21 and a top closure 22 which is slidably mounted in flanges 23 formed integrally with the member 21. The closure 22 is in the form of a flat sheet of metal having a ring 24 mounted in a bracket 25 so that the ring may be grasped by any suitable instrument or by the fingers for sliding the cover from the flanges 23.

The member 21 has a bottom 30, end walls 31 and side walls 32. Side and end walls are inclined at an angle to the vertical to conform to the inclination of the side and end walls of the tray so that when the pan-like member 21 is placed in the open top of the tray the corresponding side and end walls of both the tray and cover will frictionally engage each other so that the cover will have a neat fit within the open end of the tray for sealing the tray against the atmosphere and against the loss of fluids from the tray when in operation.

The bottom 30 is provided with transverse grooves 33 which project below the bottom and extend to the side walls 32 of the member 21. It will be noted that the side walls adjacent the bottom 30 are offset inwardly at points adjacent the ends of the channel members 33 as shown at 34, to provide a space 35 between the ends of the channels and the corresponding side walls 11 of the tray 10. The offset portions 34 of the channels are provided with perforations 36 at the ends of the channel members 33 so that fluids may pass from the tray to the cover and vice versa. This is particularly true when the tray is being used as a cooker for discharging waters of condensation from the cover into the tray.

It will be noted from Fig. 3 that the bottom 30 of the member 21 is inclined from a medial line on the centrally disposed channel member 33 toward the opposite end walls so that waters of condensation when collecting on the bottom will drain towards one of the channel members 33 and will be carried off through the perforations 36 at the opposite ends of the channel member.

From Figs. 1, 4, and 6 it will be seen that the flanges 23 are integrally formed with the side walls 32 of the shallow pan-like member 21 of the cover. These flanges are bent in U-shape formation with the sections 40 and 41 of the flanges being disposed in parallel relation and in a horizontal plane which passes through the upper edge of the side walls 32 of the member 21.

The operation of my device is as follows: The containers 16 and 17 are placed in the tray 10 as shown in Fig. 6 and the number of containers employed depends of course upon the size of said containers which may be placed in the tray. When the tray is being used as a cooker for foods a small quantity of water is placed upon the bottom 14 of the tray 10. The cover 20 is then applied to the open end of the tray 10 with the corresponding walls of the cover snugly fitting the corresponding walls of the tray whereby the tray is sealed against the loss of fluid. The tray is then placed upon a heating element and the steam generated within the tray circulates thoroughly around the containers 16 and 17 and finds its way through the perforations 36 within the chamber 21ª in the cover 20. Some of this steam is condensed and the waters of condensation fall upon the bottom 30 of the pan-like member 21 and this water of condensation finds its way to the channel members 33 whence it is discharged through the perforations against the side walls 11 of the tray 10.

It will be noted that the top or closure 22 of the pan-like member 21 snugly fits the guide members 23 with the inner face of the closure engaging the upper edges of the walls of the member 21 so that substantially little or no steam will escape from the pan-like member 21.

When the foods have been thoroughly cooked the containers 16 and 17 are removed for serving. Any of the food which remains in the containers may be left therein and placed in the tray 10 after which the closure 21 may be applied as shown in Fig. 3. The entire tray constructed of the proper dimensions to fit within a refrigerator may be placed in a refrigerator and the food kept cool until it is desired to either serve the food cold or hot. In the last-mentioned case the tray is placed on a heater until the food has the proper temperature when it may be served.

It will be seen by this construction that the tray serves the double function of providing a means for cooking foods and also for housing foods in a compact, unitary manner when placed in a refrigerator.

I claim:

1. A culinary utensil comprising a tray, a cover for the tray including a shallow pan-like member having side and end walls adapted to be nested in the top of the tray and substantially sealing the tray, the side walls of the cover having U-shaped flanges, a lid slidably mounted in the flange and forming a top closure for the cover, the bottom of the cover having spaced grooves to collect and drain away moisture from the interior of the cover, the walls of the cover at the ends of the groove having openings to permit liquid to be discharged from the cover against the adjacent walls of the tray, said bottom of the cover being inclined downwardly in opposite directions from a medial line.

2. A culinary utensil comprising a tray, a cover for the tray including a shallow pan-like member having side and end walls adapted to be nested in the top of the tray and substantially sealing the tray, the side walls of the cover having U-shaped flanges, a lid slidably mounted in the flange and forming a top closure for the cover, the bottom of the cover having spaced grooves to collect and drain away moisture from the interior of the cover, the walls of the cover at the ends of the groove having openings to permit liquid to be discharged from the cover against the adjacent walls of the tray.

3. A culinary utensil comprising a tray, a cover for the tray including a shallow pan-like member having side and end walls adapted to neatly fit into the top of the tray and seal the tray from the loss of fluids, a closure for the cover and providing with the cover a chamber within said cover, the side walls of the top having perforations to provide communication between the chamber and tray, the bottom of the cover being inclined downwardly in opposite directions from a medial line running transversely of the cover.

4. A culinary utensil comprising a tray having its side and end walls inclined, a cover for the tray including a shallow pan-like member having its side and end walls also inclined to snugly fit the similarly disposed walls of the tray, the bottom of the cover having transversely disposed channels depending below the plane of said bottom, the opposite ends of the channels having restricted communication with the tray, and a closure for the pan-like member.

5. A culinary utensil comprising a tray having its side and end walls inclined, a cover for the tray including a shallow pan-like member having its side and end walls also inclined to snugly fit the similarly disposed walls of the tray, the bottom of the cover having transversely disposed channels depending below the plane of said bottom, the opposite ends of the channels having restricted communication with the tray, the channels terminating short of the side walls of the tray, and a closure for the pan-like member and forming with said member a chamber within the top, the restricted communication providing for fluid interchange between the chamber and tray.

CHARLES W. HOPES.